United States Patent [19]
Klausmeier et al.

[11] Patent Number: 5,666,353
[45] Date of Patent: Sep. 9, 1997

[54] FRAME BASED TRAFFIC POLICING FOR A DIGITAL SWITCH

[75] Inventors: Daniel E. Klausmeier, Sunnyvale; Charles M. Corbalis, Saratoga; Kambiz Hooshmand, Santa Clara, all of Calif.

[73] Assignee: Cisco Systems, Inc., San Jose, Calif.

[21] Appl. No.: 408,273

[22] Filed: Mar. 21, 1995

[51] Int. Cl.$^6$ .................................................. H04L 12/56
[52] U.S. Cl. .................................................. 370/230
[58] Field of Search .................... 370/17, 58.1, 58.2, 370/58.3, 60, 60.1, 61, 91, 92, 93, 94.1, 230, 232, 233, 234, 905

[56] References Cited

U.S. PATENT DOCUMENTS

| | | | |
|---|---|---|---|
| 5,224,099 | 6/1993 | Corbalis et al. | 370/94.2 |
| 5,253,247 | 10/1993 | Hirose et al. | 370/14 |
| 5,274,643 | 12/1993 | Fisk | 370/94.1 |
| 5,335,222 | 8/1994 | Kamoi et al. | 370/60 |
| 5,361,251 | 11/1994 | Aihara et al. | 370/60 |
| 5,402,412 | 3/1995 | Duffe et al. | 370/17 |
| 5,426,640 | 6/1995 | Hluchyj et al. | 370/94.1 |
| 5,452,330 | 9/1995 | Goldstein | 375/257 |

FOREIGN PATENT DOCUMENTS

| | | | |
|---|---|---|---|
| 0 587 522 A2 | 3/1994 | European Pat. Off. | H04L 12/56 |
| WO 93/14604 | 7/1993 | WIPO | H04Q 11/04 |

OTHER PUBLICATIONS

"Cell Conformance Testing In ATM Networks", IEEE Communications Society, Nov. 28, 1994, pp. 1385–1393.
"The Spacer–Controller: An Efficient UPC/NPC for ATM Networks", International Switching Symposium (ISS), Oct. 25, 1992, vol. 2, pp. 316–320.
"Traffic Management Specification v4.0", The ATM Forum Technical Committee, Apr. 1996, pp.iii–vii, pp. 1–116.
CCITT, Paper Entitled: Recommendation I.371, Traffic Control and Congestion Control in B–ISDN, published Jun. 1992.
Martin de Prycker, "Asynchronous Transfer Mode: Solution for Broadband ISDN", 2ed., Ellis Horwood, 1993, pp. 304–304.
David E. McDysan & Darren L. Spohr, "ATM: Theory and Application", McGraw-Hill, 1995, pp. 367–371.

*Primary Examiner*—Douglas W. Olms
*Assistant Examiner*—Matthew C. Phillips
*Attorney, Agent, or Firm*—Blakely, Sokoloff, Taylor & Zafman LLP

[57] ABSTRACT

A frame based traffic policing system that determines if incoming data cells are conforming or non-conforming according to the a traffic contract. The frame based traffic policing system first detects a cell at the beginning or end of a frame and determines if the frame conforms with a traffic contract. If the cell does not exceed the parameters of the traffic contract, then the frame based traffic policing system deems the cell as conforming. If the cell was the first cell of a frame, then frame based traffic policing system treats all the remaining cells in the frame as conforming or non-conforming depending upon if the first data cell was conforming or non-conforming. If the cell was the last cell of a frame, then frame based traffic policing system treats all the cells of the following frame as conforming or non-conforming depending upon if the last cell of a previous frame was conforming or non-conforming. In this manner, all the data cells are from the same frame receive the same treatment by the network. The frame based traffic policing system improves the throughout of the network since the network will be less likely to waste resources transmitting cells from a corrupted frame.

32 Claims, 13 Drawing Sheets

Figure 8 "Prior Art"

FIGURE 11   At the time of arrival $t_a$ of the first cell of the connection, $X = 0$ and $LCT = t_a(k)$

FRAME BASED TRAFFIC POLICING FOR A DIGITAL SWITCH

FIELD OF THE INVENTION

The present invention relates to the field of digital communication switches. More particularly, the present invention relates to a frame based traffic policing system in a digital switch for a cell relay network.

BACKGROUND OF THE INVENTION

Cell switching is a method of transmitting information wherein a frame of information is broken into equal sized units called "cells." The cells of information are usually grouped into larger units called "frames." The individual cells of information are transmitted from a source node to a destination node through a network constructed of communication lines and switches. At the destination node, the individual cells of information are reconstructed into a frame.

Each frame of information usually includes some type of data integrity mechanism such as a data integrity value that is used to determine if the information in the frame was reliably transmitted across the network. If any information in the frame was corrupted during transmission, then the data integrity value will indicate that a transmission error has occurred.

Digital communication networks have a limited amount of bandwidth such that only a certain amount of information can be transmitted across the network per unit time. To allocate the available bandwidth in a network, a network provider and the network customers enter into a communication "traffic contract" that specifies the rates at which customers may transmit data into the network.

The traffic contract is enforced at the entry point of the network with a traffic policing function at the network interface. Each arriving cell is checked to determine whether the cell complies with the traffic contract. If a cell is deemed non-conforming (the cell does not comply with the traffic contract), the network provider may discard the cell. Alternatively, the network provider may transmit the non-conforming cell of information at a reduced priority. Reduced priority cells are the first cells to be discarded when congestion is detected within the network. An example of a traffic policing function is the "leaky bucket" algorithm as described in CCITT Document I.371.

When a network provider discards a single non-conforming data cell from a frame, the data integrity mechanism for that frame will indicate a transmission error has occurred while transmitting the frame. When transmission errors occur during the transmission of a frame, the entire frame is discarded by the receiver and must be retransmitted across the network. Thus, all the individual cells from a corrupted frame must be retransmitted regardless whether or not these cells contained transmission errors. The result is that the percent of frames that must be retransmitted may be much larger than the percent of cells discarded by the network. Additionally, the network wastes resources by transmitting cells from corrupted frames that midst ultimately be retransmitted from the sender to the receiver.

SUMMARY AND OBJECTS OF THE INVENTION

An object of the present invention is to provide a traffic policing system that determines if incoming cells comply with a communication traffic contract on a frame basis such that all cells within the same frame are treated in the same manner by the network. Thus, all the cells from a frame will be accepted or all the cells from a frame will be discarded. By treating all the cells within a frame in the same manner, the throughput of the digital network is maximized during periods of network congestion.

This and other objects are performed by the frame-based traffic policing system of the present invention. The frame based traffic policing system examines the first data cell of each frame to determine if the first data cell complies with the user's communication traffic contract. If the first data cell of the frame complies with the communication traffic contract, then that first data cell will be determined to be "conforming". If the first data cell exceeds the parameters of the communication traffic contract, then that first data cell is determined to be "non-conforming." Non-conforming data cells may be tagged as low priority or simply discarded. The frame based traffic policing system then specifies the conformity of all the remaining data cells in the frame to be the same as the first data cell. In this manner, if the first data cell from a particular frame is conforming, then all the data cells from that frame will be treated as conforming. Similarly, if the first data cell of the frame is deemed non conforming, then all the cells of that frame are non conforming.

Other objects, features and advantages of the present invention will be apparent from the accompanying drawings, and from the detailed description that follows below.

BRIEF DESCRIPTION OF THE DRAWINGS

The present invention is illustrated by way of example and not limitation in the figures of the accompanying drawings in which like references indicate similar elements and in which.

DETAILED DESCRIPTION

Methods and apparatus for implementing a frame-based traffic policing system for a digital communication system are disclosed.

A Broadband Network

Figure 1A:
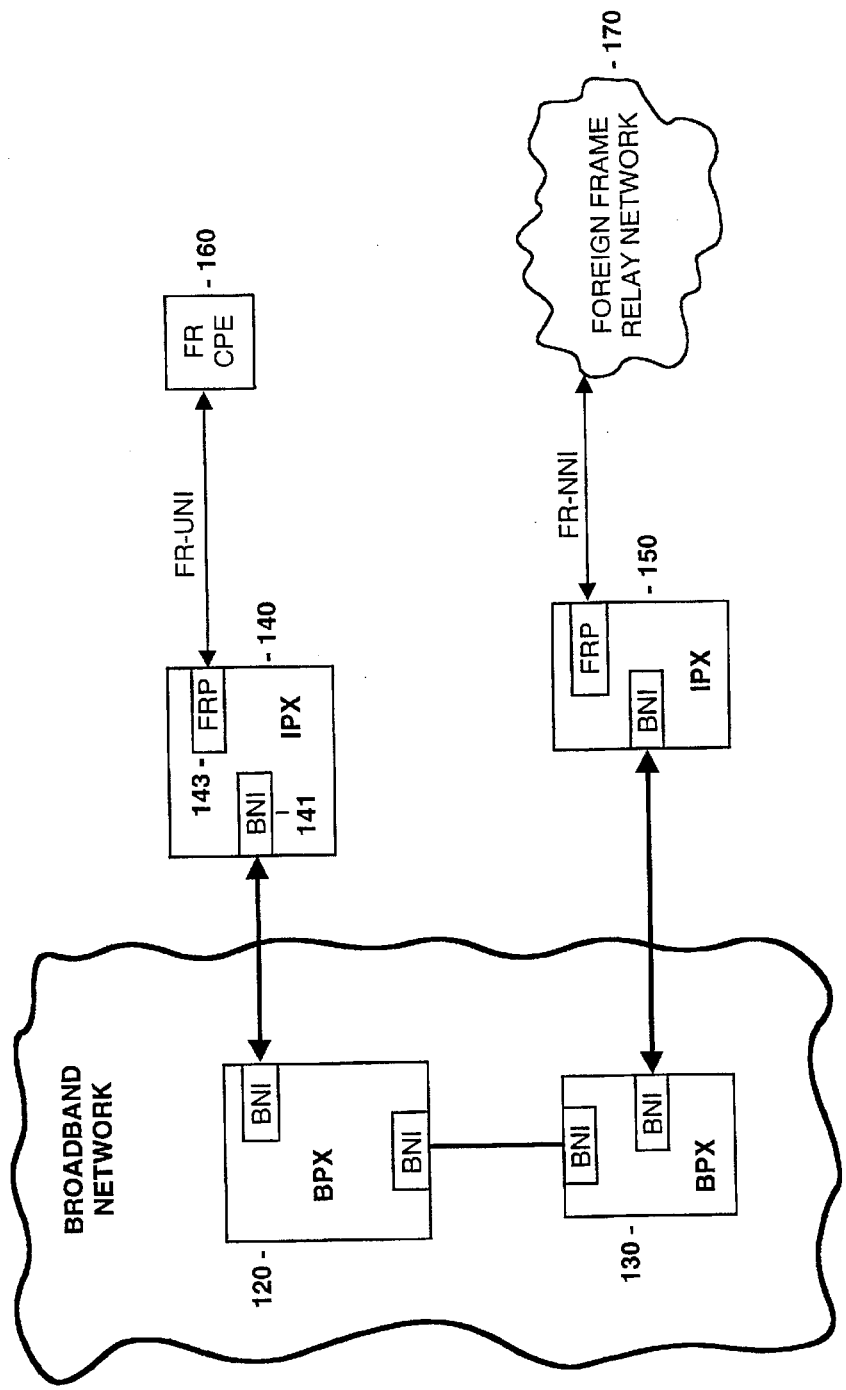
FIG. 1a illustrates a digital communication network constructed with Stratacom™ BPX™ and IPX™ digital switches.

FIG. 1a illustrates a digital communications network topology. The network illustrated in FIG. 1a is a cell switched digital communication network constructed of Broadband Packet Exchanger (BPX™) modules and Integrated Packet Exchanger (IPX™) modules sold by Stratacom of San Jose, Calif. The Stratacom BPX™ modules and the Stratacom IPX™ modules function as digital switches that are capable of building virtual circuits for routing cells. The Stratacom BPX™ modules serve as the backbone for a broadband digital Wide Area Network (WAN). The Stratacom IPX™ modules couple smaller narrowband digital communication links to the broadband digital network.

Each BPX™ module is a digital switch coupled to one or more broadband digital communication lines. Examples of broadband digital communication lines include E3 lines, T3 lines, and OC3 lines. The BPX™ digital switches are also coupled to IPX™ digital switches using broadband digital communication links.

Each IPX™ digital switch in FIG. 1a is used to couple slower digital communication lines to the broadband digital communication network. The customer premise equipment 160 may consist of any type of digital communication equipment such a Private Branch Exchange (PBX) or a packet router.

Figure 1B:
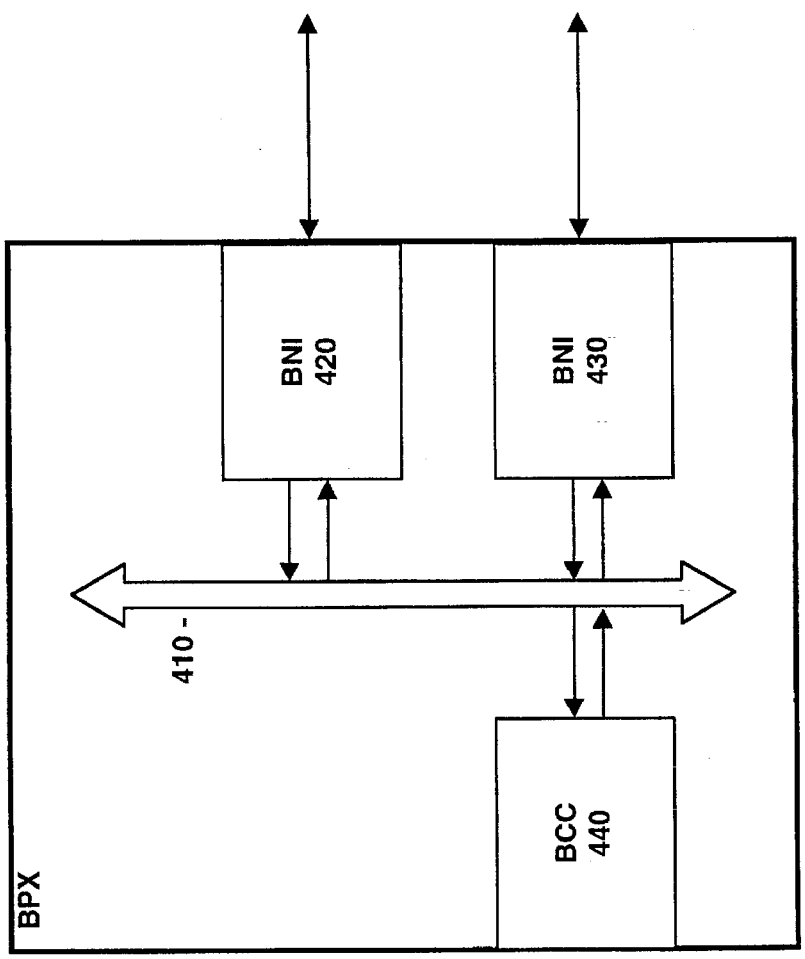
FIG. 1b illustrates an internal block diagram of a Stratacom™ BPX™ digital switch.

FIG. 1b illustrates a block diagram of the internal mechanisms of a BPX™ digital switch. Each BPX™ digital switch consists of a plurality of Broadband Network Interface (BNI) units (BNI 420 and BNI 430) and a BPX Control Card (BCC) unit 440.

Each Broadband Network Interface (BNI) unit consists of a network interface connected to a broadband digital communication line. Every Broadband Network Interface unit is also coupled to a high-speed backplane bus 410 within the BPX™ digital switch. In the present embodiment the backplane bus 410 of the BPX™ comprises the Stratabus™.

The BCC unit 440 also coupled to the backplane bus 410. The BCC unit 440 functions as a digital crossbar switch that routes data cells to and from all the different digital communication lines that are coupled to the BPX™ digital switch.

Cell Switched Communications

Figure 2:
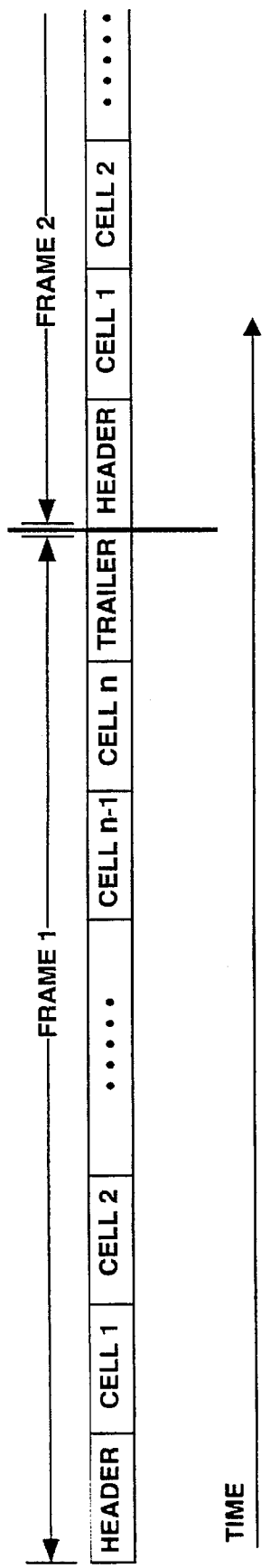
FIG. 2 illustrates a data frame consisting of a number of data cells that carry digital information.

In cell switched communications systems data frames of information are segmented into smaller cells. FIG. 2 illustrates an example of a data frame of information. As illustrated in FIG. 2, each data frame contains a header, a series of data cells, and a trailer The individual data cells of the data frame carry the information to be transmitted. The header and trailer contain overhead information such as a data integrity value used to reliably communicate the information contained in the data cells of the data frame. For example, a data integrity checksum such as a Cyclic Redundancy Check (CRC) value is usually placed in the trailer of a data frame to ensure the integrity of the transmitted frame.

A Broadband Network with the ATM Service Interface

Figure 3:
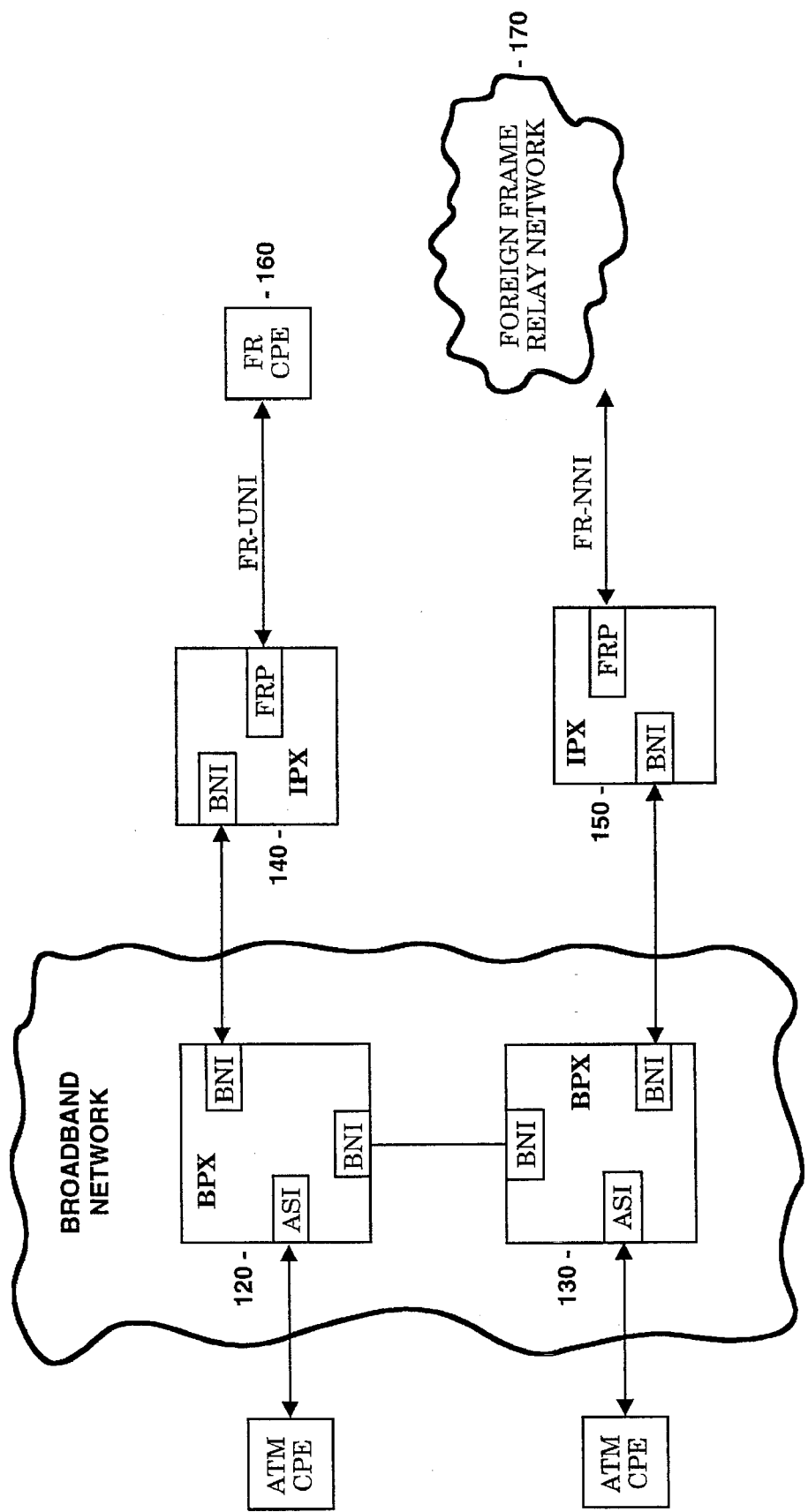
FIG. 3 illustrates a digital communication network constructed with Stratacom BPX™ and IPX™ switches wherein the Stratacom BPX™ switches have ATM Service Interface (ASI) cards.

FIG. 3 illustrates a broadband network incorporating the teachings of this patent. In the network diagram of FIG. 3 each BPX™ digital switch includes an Asynchronous Transfer Mode (ATM) Service Interface card (ASI). The ATM service interface (ASI) cards in each BPX™ digital switch can be used to directly connect a BPX™ digital switch to any customer premise equipment that uses asynchronous transfer mode (ATM) communications and supports the proper interface. In the present embodiment, a T3 based communication link is used to carry the information.

Figure 4:
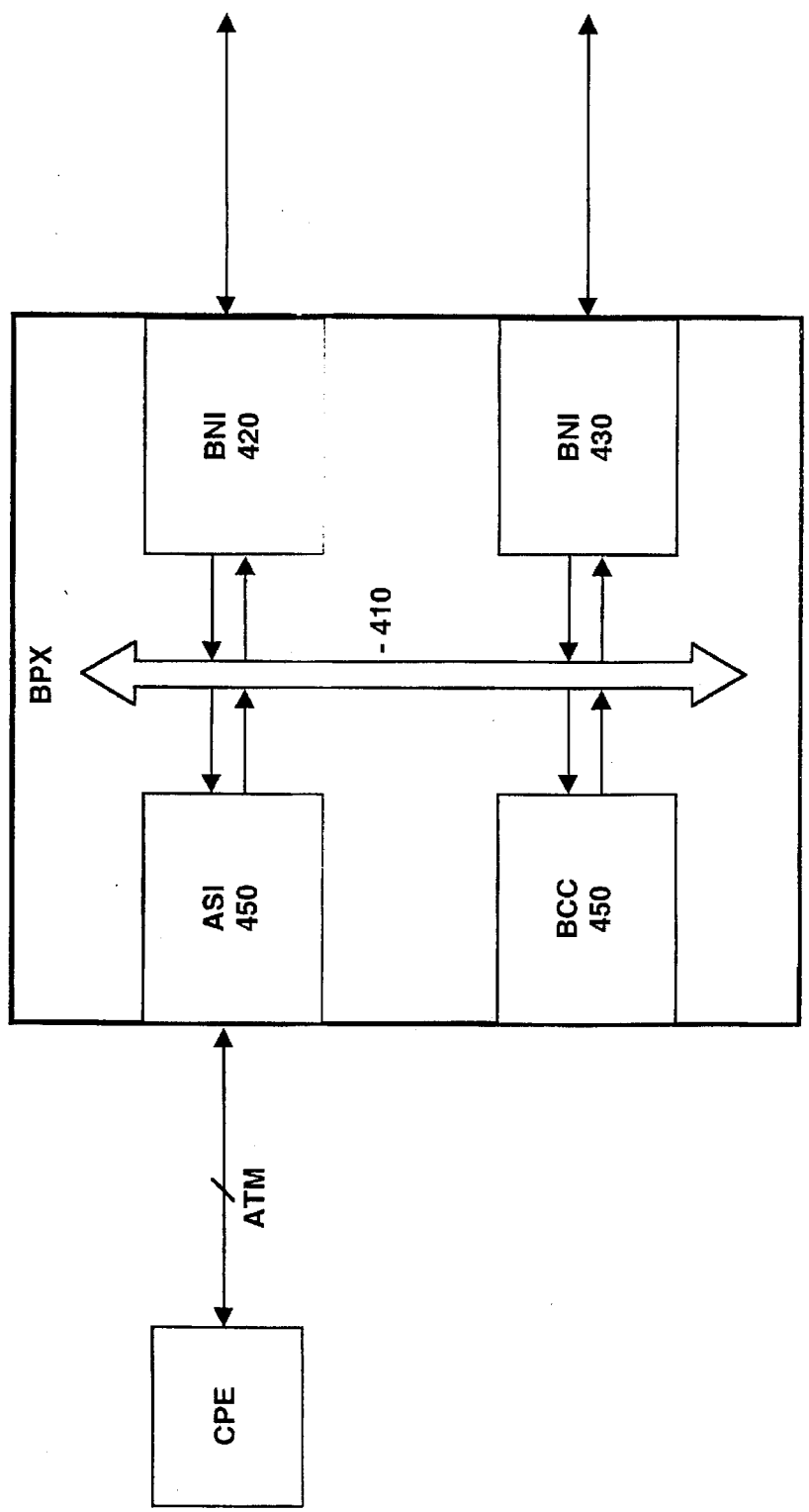
FIG. 4 illustrates an internal block diagram of a Stratacom BPX™ digital switch with an ATM Service Interface (ASI) card.

FIG. 4 illustrates an internal block diagram of a BPX™ digital switch with an ATM service interface (ASI) card 450 installed. Customer premise equipment (CPE) can be a coupled directly to the ASI card using an asynchronous transfer mode (ATM) communications link. Within the BPX™ switch, the ATM service interface (ASI) card 450 is coupled to the BCC crosspoint switch 440 via the high-speed Stratabus™ 410 on the BPX™ backplane. In this manner, the information from the Customer premise equipment transmitted across the asynchronous transfer mode communications link can be switched to other communication links coupled to the BPX™ digital switch.

The ATM Service Interface Card

Figure 5:
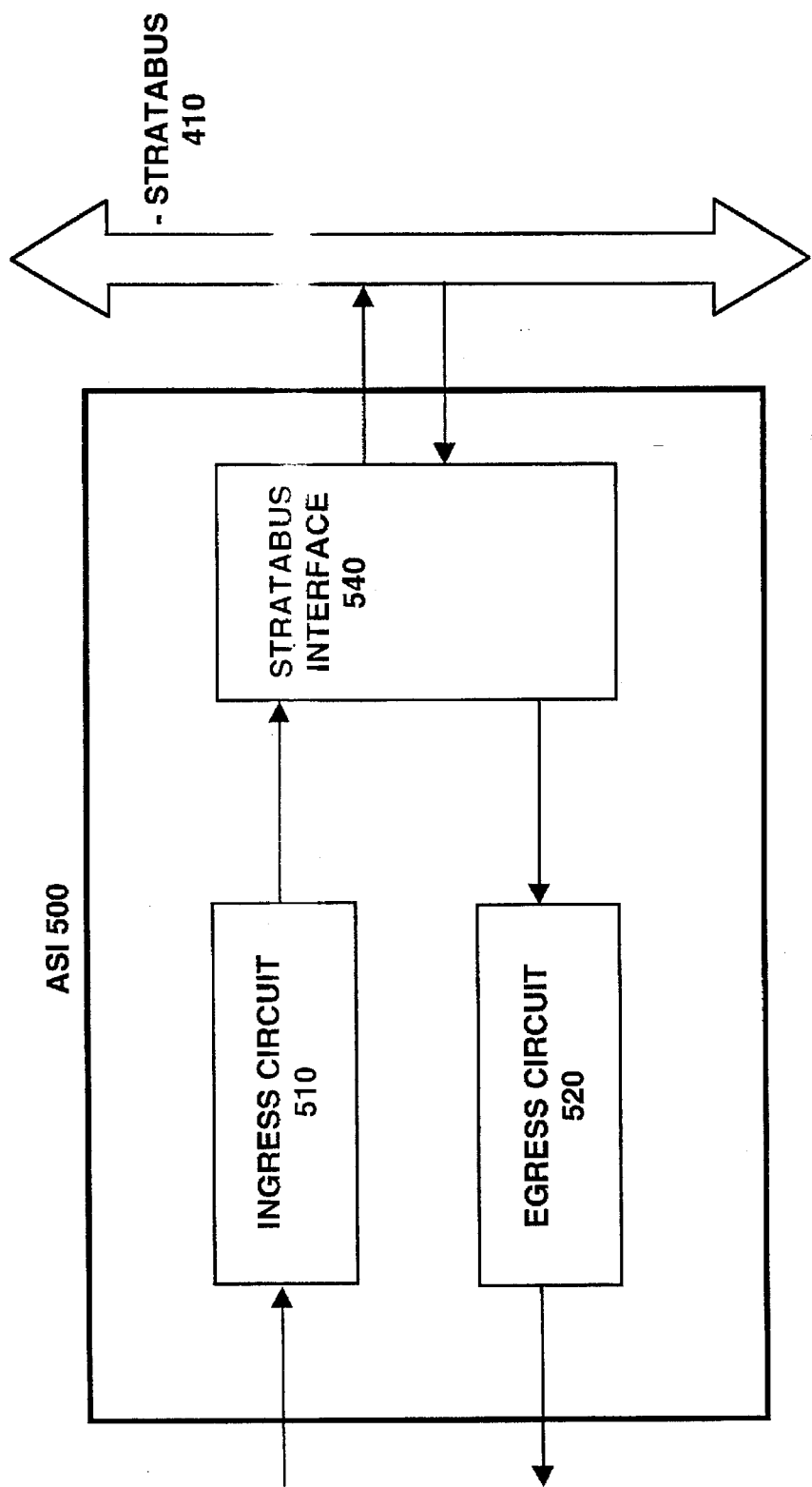
FIG. 5 illustrates an internal block diagram of an ATM Service Interface (ASI) card.

FIG. 5 illustrates an internal block diagram of an ATM service interface (ASI) card 500. The ATM service interface (ASI) card 500 comprises an ingress circuit 510, an egress circuit 520 and a Stratabus™ interface circuit 540. The ingress circuit 510 is connected to a communications line that uses asynchronous transfer mode (ATM) protocol. The ingress circuit 510 processes incoming data cells received from the communications line. The egress circuit 520 is also connected to the communications line and processes outgoing data cells. The Stratabus™ interface circuit 540 is coupled to both the ingress circuit 510 and the egress circuit 520 and distributes data cells to the Stratabus™ 410 within the BPX™ digital switch.

Figure 6:
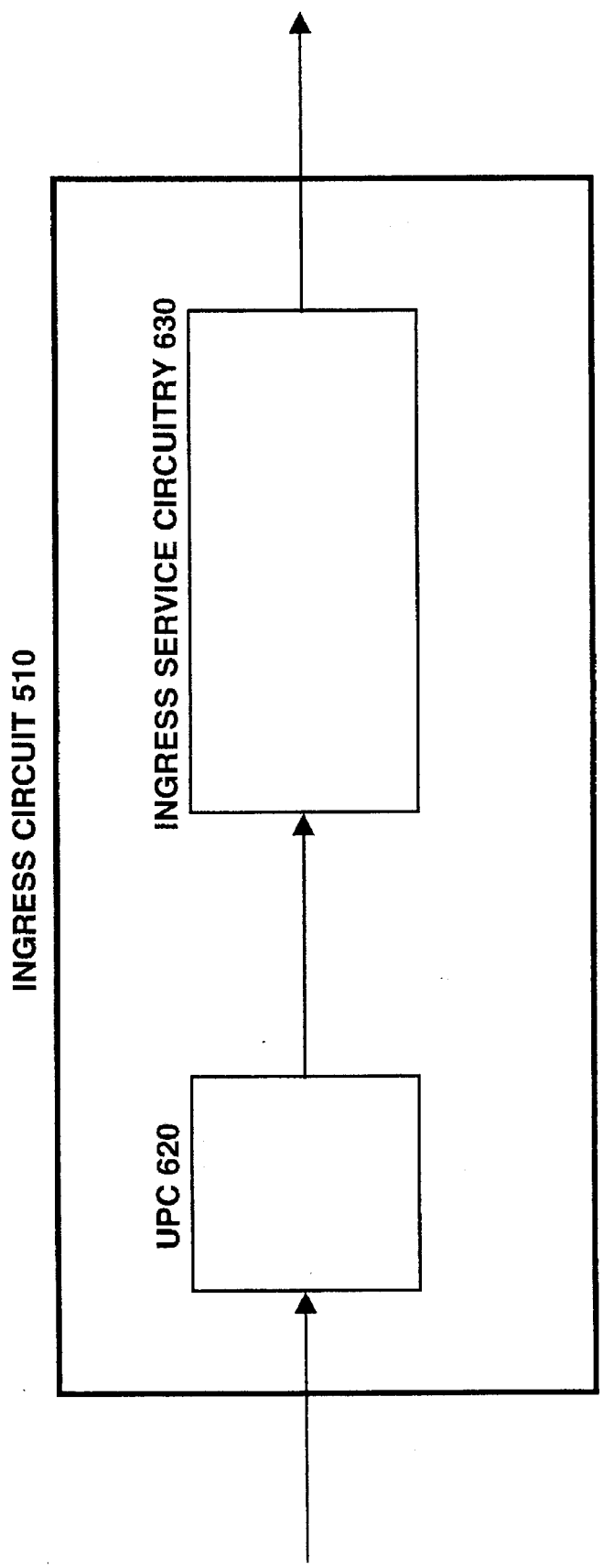
FIG. 6 illustrates an internal block diagram of the ingress circuit in an ATM Service Interface (ASI) card.

FIG. 6 illustrates an internal block diagram of the ingress circuit 510. The ingress circuit 510 consists of a Traffic Policing circuit (UPC) 620 and the remaining ingress circuitry 630. The purpose of the Traffic Policing circuit 620 is to enforce the traffic contract to which a customer has subscribed. The Traffic Policing circuit 620 determines if each incoming data cell is a "conforming" cell. Specifically, the Traffic Policing circuit 620 determines if each incoming data cell complies with the limits placed upon the incoming data link according to a communication traffic contract.

For example, if a user sends a series of data cells so quickly that the user exceeds the maximum data rate allowed by the communication traffic contract, then the Traffic Policing circuit 620 will indicate that the cells are "non-conforming" data cells according to the communication traffic contract. Non-conforming data cells may be tagged as low priority or simply discarded. Discarded data cells may not be recovered. Data cells that are tagged as low priority are kept within the digital switch and transmitted if there is sufficient bandwidth available. However, data cells tagged as low priority are discarded if there is too much congestion in the network.

To enforce the limits specified within a communication traffic contract, the Traffic Policing circuit 620 implements a Generic cell rate algorithm such as continuous-state leaky bucket algorithm or the virtual scheduling algorithm as described in the CCITT Recommendation I.371 Document, Geneva 1992 (See Annex 1).

Figure 7:
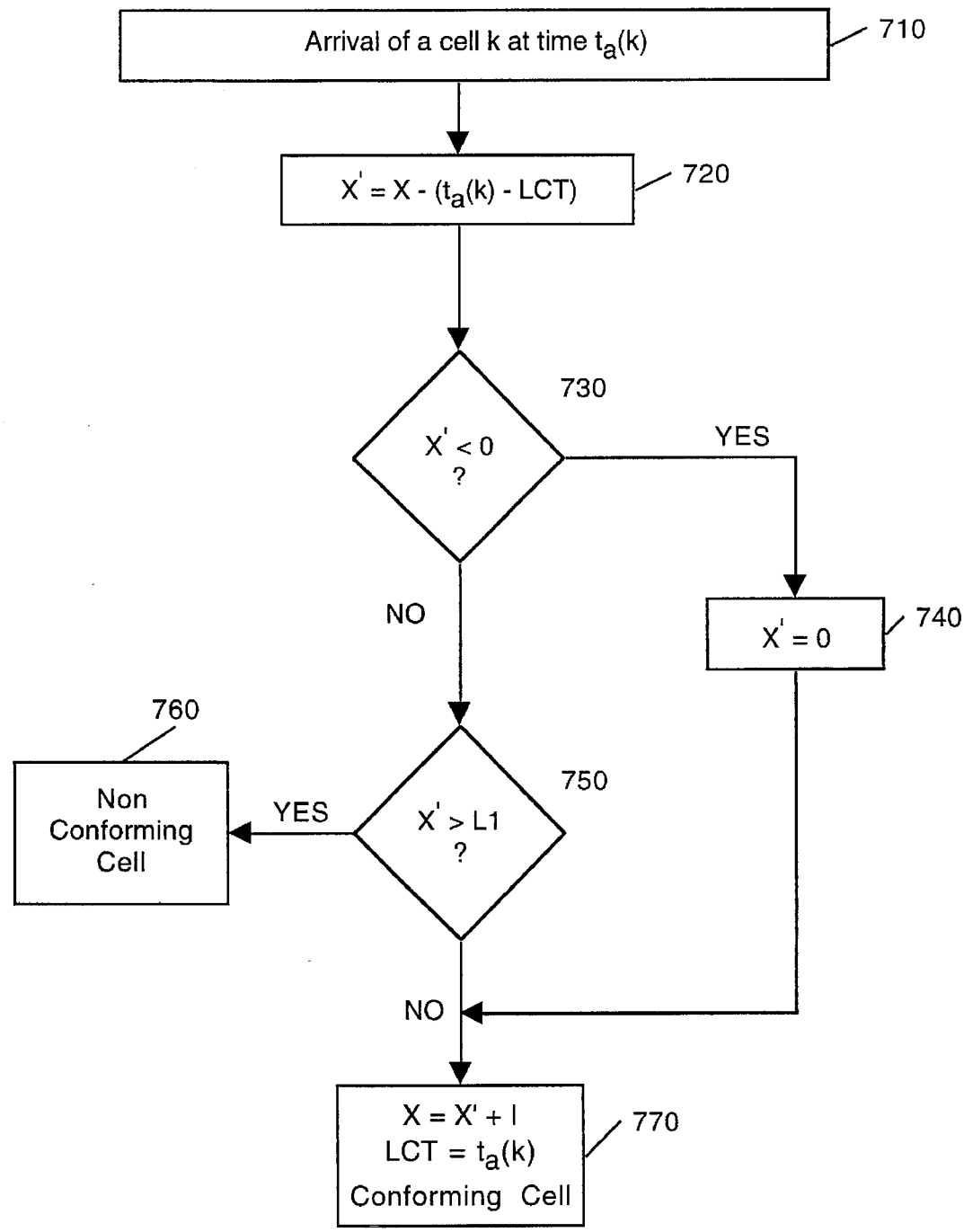
FIG. 7 illustrates a flow diagram of a Continuous State Leaky Bucket Algorithm that implements traffic policing.

FIG. 7 illustrates a flow diagram describing how the continuous-state leaky bucket algorithm operates. The continuous-state leaky bucket algorithm maintains a "bucket" of debit markers. The debit markers are drained from the bucket over time. Each time a cell arrives, the depth of the bucket is evaluated with respect to a threshold. The cell is considered conforming if the bucket is below this threshold. If a cell is found to be conforming, debit markers are added to the bucket. When cells arrive at a faster rate than the traffic contract allows, debit markers accumulate in the debit marker bucket. Eventually, the debit marker bucket overflows indicating that a user is exceeding the bounds of a communications traffic contract.

As illustrated in FIG. 7, the algorithm is invoked when a cell is received at step 710. A temporary bucket counter (X') is calculated at step 720 by subtracting off the amount of time since the last conforming cell. The temporary bucket counter (X') is tested at step 730 to determine if it is less than zero. If the temporary bucket counter (X') is less than zero then it is set to zero at step 740 and the cell is deemed conforming at step 770 where the bucket is incremented by the cost of processing the conforming cell. If the temporary bucket counter (X') was not less than zero at step 730 then the temporary bucket counter (X') is tested to see if it exceeds a limit set on the bucket. If the temporary bucket counter (X') exceeds the limit, then the cell is deemed non-conforming at step 760. Otherwise the cell is deemed conforming at step 770 and the bucket counter (X) is incremented by the cost of processing the conforming cell.

Figure 8:
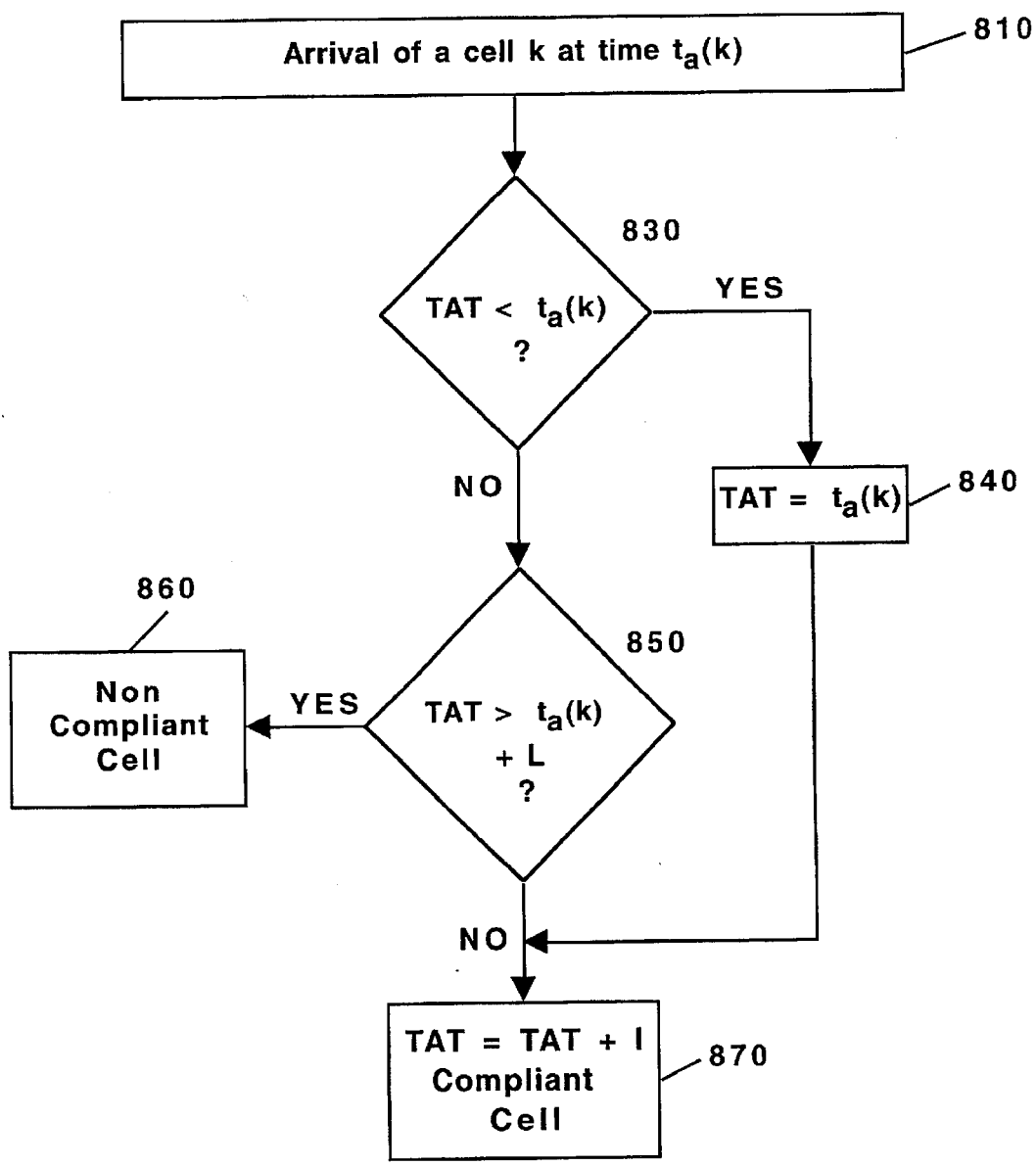
FIG. 8 illustrates a flow diagram of a Virtual Scheduling Algorithm that implements traffic policing function.

FIG. 8 illustrates a flow diagram of a virtual scheduling algorithm for performing traffic control. The virtual scheduling algorithm updates a Theoretical Arrival Time value (TAT) that defines a "nominal" arrival time of a data cell assuming that the incoming cells are equally spaced when the source is active. If the actual arrival time of a cell is not too early relative to the Theoretical Arrival Time value (TAT), then the cell is conforming, otherwise the cell is non-conforming. Specifically, if the actual arrival time of a cell is later than the Theoretical Arrival Time value minus a limit (TAT–L) then the cell is conforming.

Referring to FIG. 8, the algorithm is invoked when a cell is received at step 810. At step 830, the algorithm checks if the arrival time of the $k^{th}$ cell, $t_a(k)$, is after the current value of the Theoretical Arrival Time (TAT). If the cell arrived after the Theoretical Arrival Time (TAT) then the cell is conforming and Theoretical Arrival Time (TAT) is updated to the current time $t_a(k)$ (at step 840) plus the increment I (at step 870). If the cell arrives before the Theoretical Arrival Time (TAT), then the algorithm checks if the cell arrived longer than a limit L time before the Theoretical Arrival Time (TAT) at step 850. Specifically, if the arrival time of the $k^{th}$ cell is less than TAT–L (i.e., if TAT is greater than $t_a(k)+L$), then the cell is non-conforming and the Theoretical Arrival Time (TAT) is unchanged. Otherwise, the cell is conforming and the Theoretical Arrival Time (TAT) is increased by the increment I at step 870.

Referring back to frame diagram FIG. 2, information is transmitted across communication lines as a set of data frames wherein each data frame is subdivided into a number of data cells. Each data frame includes a data integrity value that is encoded within the data frame. (Usually in the frame trailer.) When a receiver at a destination node receives an entire data frame, the receiver evaluates the data with respect to the data integrity value included in the data frame. If the data integrity value in the frame does not match what is expected, then the data frame is discarded since it contains errors.

To receive a valid frame, every bit of information must be properly transmitted. If the network discards any data cell from a data frame, the computed data integrity value for the data frame will not match the data integrity value received within the data frame. Thus if a single data cell is not transmitted, the entire data frame will be invalid and must be retransmitted.

Frame-Based Traffic Policing

To increase the number of valid frames sent across a network when there are non-conforming data cells, a frame based traffic policing system has been implemented. In a first embodiment of a frame based traffic policing system, a conformity decision is first made for the first data cell of each data frame depending upon the current state of the traffic policing algorithm. The conformity determination for the remaining data cells in each frame then depends upon whether the first cell of the frame was conforming or not. By determining the conformity of each non-first data cell based upon the first data cell of the frame, each data frame will either be completely conforming or completely non-conforming. The frame based traffic policing system is best explained with reference to flow diagrams. The frame based traffic policing system will first be explained in the context of the continuous-state leaky bucket traffic control algorithm and then in the context of the virtual scheduling traffic control algorithm.

Figure 9:
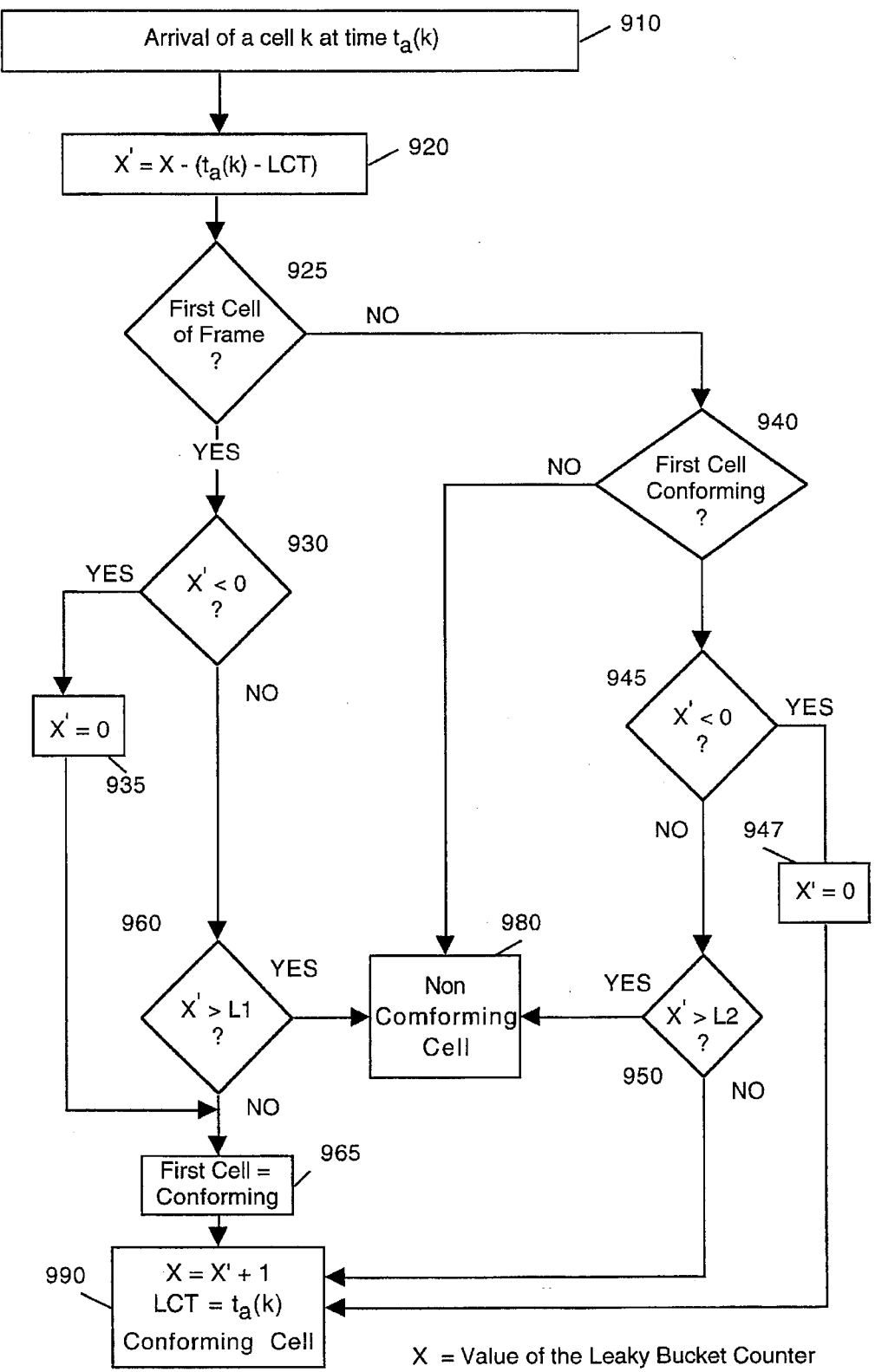
FIG. 9 illustrates a flow diagram of a frame-based traffic policing system that uses the Continuous State Leaky Bucket Algorithm.

FIG. 9 illustrates a flow diagram for the frame based version of the continuous-state leaky bucket traffic policing algorithm. The frame based continuous-state leaky bucket system is activated when a cell is received at step 910. As in the normal continuous-state leaky bucket system, a temporary bucket counter is calculated at step 920. However, the frame based continuous-state leaky bucket system then differs at step 925 where it tests to see if the received cell is the first cell of a frame. If the received cell is the first cell of a frame, then cell is treated the same as in the normal continuous-state leaky bucket system of FIG. 7. That is, the first cell is deemed conforming if the temporary bucket counter (X') is less than zero at step 930. If the temporary bucket counter (X') was not less than zero at step 930 then the temporary bucket counter (X') is tested at step 960 to see if it exceeds a limit (L1) set on the bucket. If the temporary bucket counter (X') exceeds the L1 limit, then a flag is set indicating that first cell was non-conforming at step 975 and the cell is deemed non-conforming at step 980. Otherwise a flag is set indicating that first cell was conforming at step 965 and the cell is deemed conforming at step 990 and the bucket counter (X) is incremented by the cost of processing the conforming cell.

However, if at step 925 it is determined that the cell is not the first cell of a frame then a different method of determining conformity is used. If step 925 determines that the cell is not the first cell of a frame, then the system tests if the first cell of the frame was conforming at step 940. If the first cell was non-conforming, then the current cell is also deemed non-conforming at step 980. If the first cell was conforming, then the system tests if the bucket counter has dropped below zero at step 945. If the bucket counter dropped below zero, then the system sets the bucket counter to zero at step 947 and deems the cell conforming at step 990. If the bucket counter is not below zero, then one final test is performed.

A problem can occur if the last data cell in a frame that contains the marker indicating the end of a frame becomes lost, dropped or damaged during transmission. Alternatively, an unscrupulous user may cause problems by not sending a cell containing an end of frame marker in an attempt to send more data cells than allowed by the user traffic contract. If either of these two events occur, the received frame will appear to be an oversized frame. The large number of cells in the oversized frame may overrun the buffers in the system.

The system of the present invention implements two features to prevent problems with oversized frames overrunning the buffers in the system. The first feature is that all End-of-frame (EOF) cells are treated as conforming such that EOF frames will not be dropped during transmission. The second feature is that the system of FIG. 9 has a second limit that is an "absolute" limit. Any data cell received after the bucket counter exceeds the second (absolute) limit will be deemed non-conforming. As illustrated in FIG. 9, the system tests if the temporary bucket counter exceeds the second limit (L2) at step 950. If the second limit is exceeded, then the cell is deemed non-conforming at step 990. Otherwise, the cell is deemed conforming at step 980. To ensure that an entire frame can be served, the amount of space between the first limit and the second (absolute) limit is large enough to accommodate an entire frame of data cells. In this manner, even if the first cell of a frame is the last cell to fall below the first limit, the remaining cells of that frame will also be deemed conforming since the second limit of the bucket counter will not be exceeded.

Figure 10:
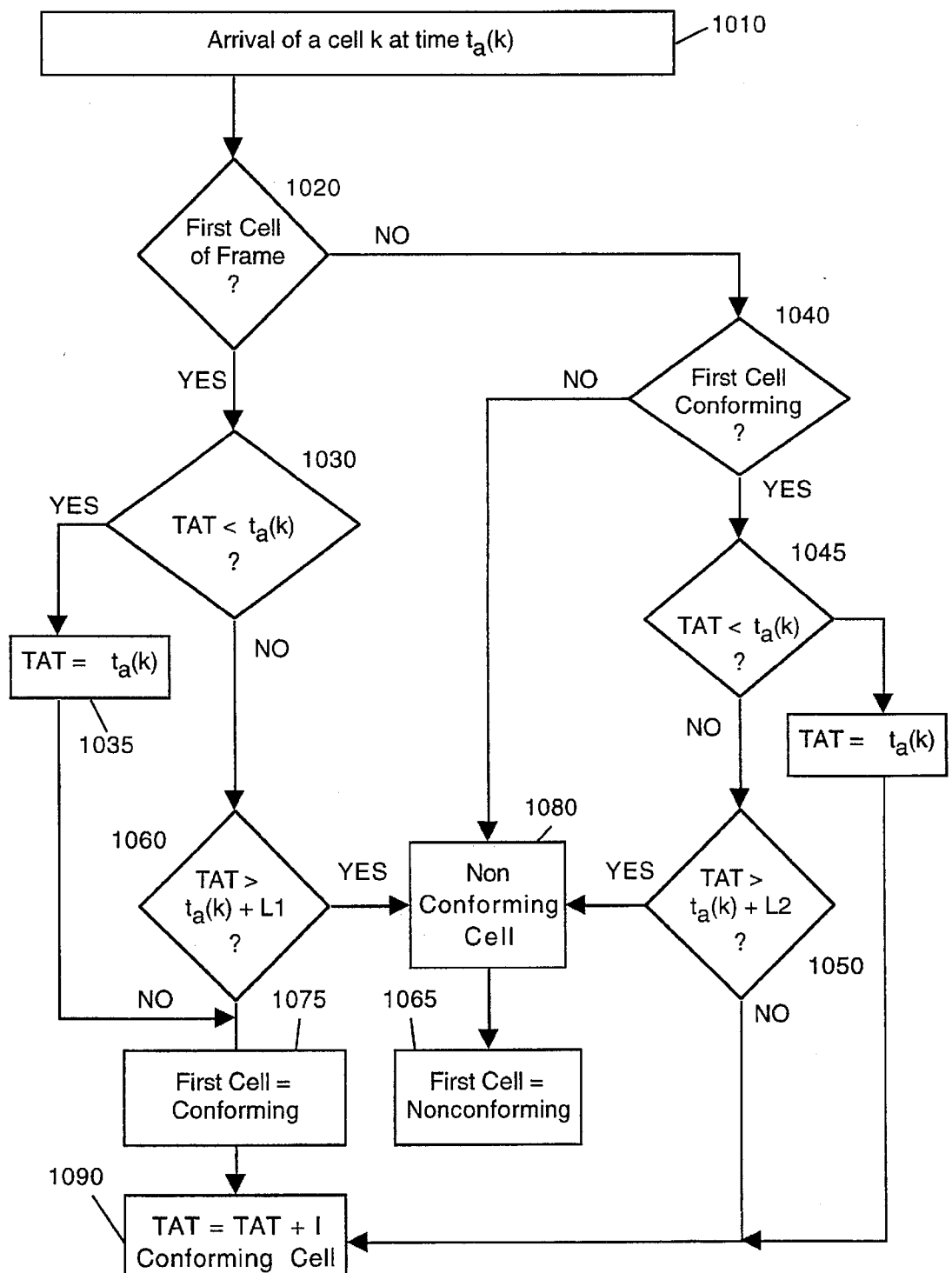
FIG. 10 illustrates a flow diagram of a frame-based traffic policing system that uses the Virtual Scheduling Algorithm.

FIG. 10 illustrates a flow diagram of a frame-based virtual scheduling algorithm for performing traffic control. Referring to FIG. 10, the algorithm is invoked when a cell is received at step 1010. At step 1020, the system tests if the cell is the first cell of a frame. If the cell is the first cell of a frame, then cell is treated the same as in the normal virtual scheduling algorithm of FIG. 8. Specifically, at step 1030 the algorithm checks if the arrival time of the first cell, $t_a(k)$, is after the current value of the Theoretical Arrival Time (TAT). If the first cell arrived after the Theoretical Arrival Time (TAT) then the first cell is conforming such that a flag is set indicating that first cell was conforming (at step 1075) and the Theoretical Arrival Time (TAT) is updated to the current time $t_a(k)$ (at step 1035) plus the increment I (at step 1090). If the cell arrives before the Theoretical Arrival Time (TAT), then the algorithm checks if the cell arrived longer than a limit L1 time before the Theoretical Arrival Time (TAT) at step 1060. Specifically, if the arrival time of the $k^{th}$ cell is less than TAT–L1 (i.e., if TAT is greater than $t_a(k)+L1$), then the first cell is non-conforming such that a flag is set indicating that the first cell was non-conforming (at step 1065) and the Theoretical Arrival Time (TAT) is unchanged. Otherwise, the first cell is conforming such that a flag is set indicating that first cell was conforming (at step 1075) and the Theoretical Arrival Time (TAT) is increased by the increment I at step 090.

If back at step 1020 the received cell was determined not to be a first cell of a frame, then the system checks the flag to determine if the first cell of the frame was conforming at step 1040. If the first cell of the frame was non-conforming, then this current cell is also deemed non-conforming. If the first frame was conforming, then another test is performed at step 1050 to determine if the arrival time of the $k^{th}$ cell is less than TAT–L2 (i.e., if TAT is greater than $t_a(k)+L2$). If the arrival time of the $k^{th}$ cell is less than TAT–L2 (TAT is greater than $t_a(k)+L2$), then the cell is non-conforming and the Theoretical Arrival Time (TAT) is unchanged at step 1080. Otherwise, the cell is conforming such that the Theoretical Arrival Time (TAT) is increased by the increment I at step 1090.

Thus, the frame based traffic policing system of the present invention ensures that if the first data cell of a frame is non-conforming, then all the data cells of that frame will be non-conforming. Furthermore, if the first data cell of a frame is conforming, then all the data cells of that frame are deemed conforming unless an absolute limit is exceeded. In this manner, the frame based traffic policing system treats every data cell from the same frame as all conforming or all non-conforming unless an overflow occurs.

Alternate Embodiment of Frame-Based Traffic Policing

In a preferred embodiment, the first cell of each frame cannot easily be distinguished. Instead, the last data cell of each frame contains an End-Of-Frame (EOF) marker that identifies the data cell as being at the end of the frame. In such as situation, the first cell of the next frame can be identified as the cell following an End-Of-Frame (EOF) cell. In such an environment, the framed-based traffic policing system may make a conformity decision for an entire frame by determining if the last cell of the previous frame conforms. However, if the flamed-based traffic policing system determines that the next entire frame should conform, then the framed-based traffic policing system should deem the last cell of the current frame as conforming such that the beginning the next frame will easily be identified.

Figure 11:
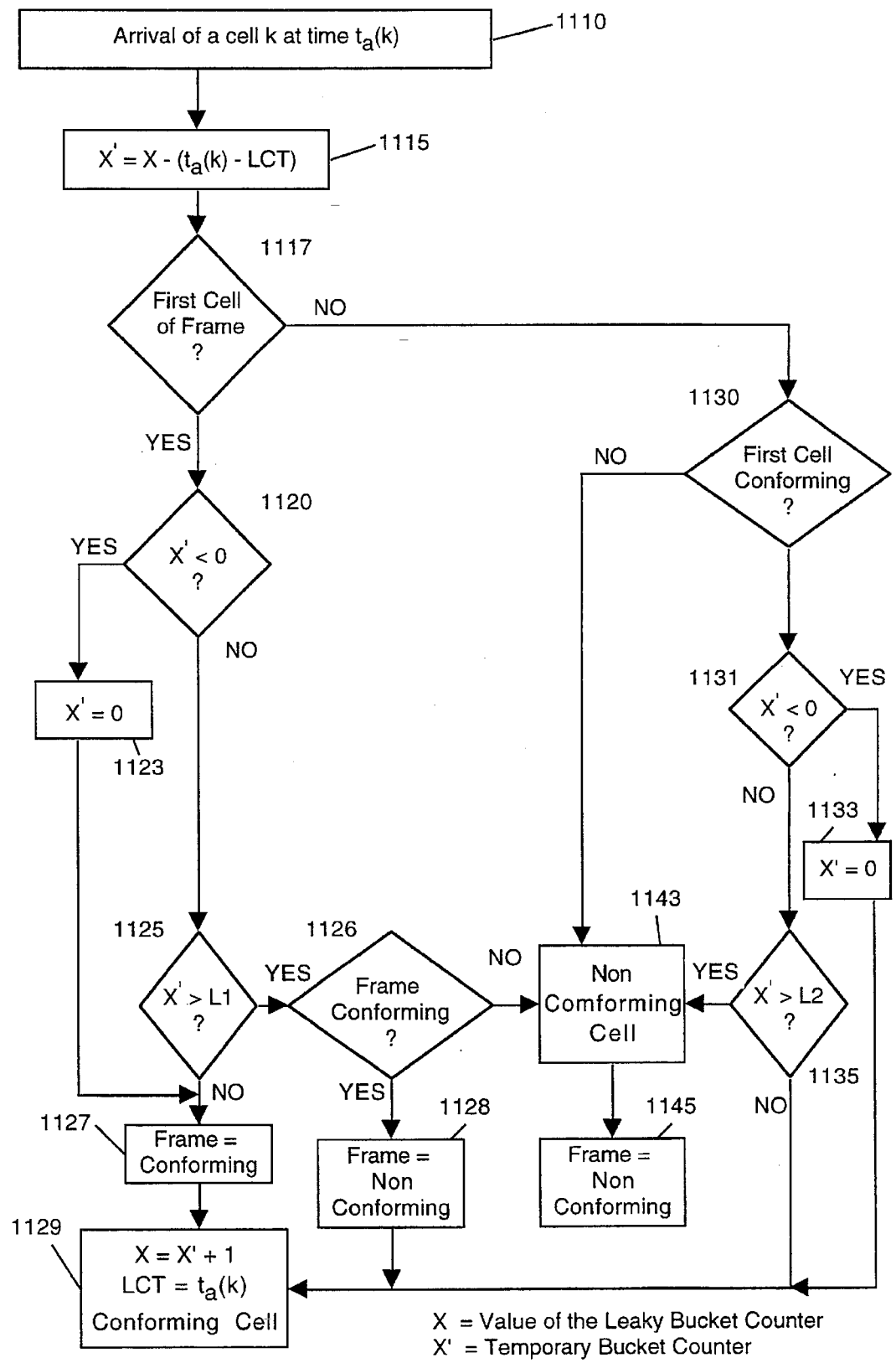
FIG. 11 illustrates a flow diagram of an alternate frame-based traffic policing system that uses the Continuous State Leaky Bucket Algorithm.

FIG. 11 illustrates a flow diagram that describes the method steps performed by the frame based traffic policing system using the continuous state leaky bucket algorithm where the last cell of a frame before a conforming frame is always deemed conforming. The method begins at step 1110 when an incoming data cell is received. The method then calculates a temporary bucket counter value at step 1115 by subtracting off the amount of time elapsed since the last conforming data cell. The frame based traffic policing system then determines if the incoming data cell is the last data cell of a frame or not at step 1117. If a received data cell is the last data cell of a frame, the frame based traffic policing system proceeds to step 1120 where it determines if the number of debit markers in the temporary bucket counter has dropped below zero. If the number of temporary bucket counter has dropped below zero, then the temporary bucket counter is set to zero at step 1123 and the method proceeds to step 1127 where the next frame is deemed conforming and step 1129 where the cell is deemed conforming causing the bucket counter to be increased. If at step 1120 the temporary bucket counter was greater or equal to zero, then the temporary bucket counter is compared with the first bucket limit (L1). If the temporary bucket counter is less than the first bucket limit (L1), then the next frame is deemed conforming at step 1127 and the cell is deemed conforming causing the bucket counter to be increased at step 1129. Otherwise, if the temporary bucket counter exceeds the first limit, then the next frame will be deemed non-conforming. However, since this is the last cell of the current frame it must be still be handled appropriately. Thus, the traffic policing system tests if the current frame is conforming at step 1126. If the current frame is not conforming then the last cell is deemed non-conforming at step 1143 and the frame is deemed non-conforming at step 1145. If the current frame is conforming then the next frame is deemed non-conforming at step 1128 and the last cell is deemed conforming causing the bucket counter to be increased at step 1129.

If back at step 1117, the cell was determined not to be the last cell of the frame, then the cell is handled like all the other cells in the frame unless the second (overflow) limit of the bucket counter is reached. Specifically, non last cells are first tested at step 1130 to determine if the current frame is conforming. If the current frame is not conforming then the cell is treated as non-conforming at step 1143. If the current frame is conforming, then temporary bucket counter is tested at step 1131 to see if it is less than zero. If the temporary bucket counter is less than zero then the temporary bucket counter is set to zero at step 1133 and the method proceeds to step 1129 where the cell is deemed conforming causing the bucket counter to be increased. If the temporary bucket counter is not less than zero then the temporary bucket counter is tested at step 1135 to determine if the second (L2) limit is exceeded. If the overflow limit is exceeded then the cell is determined to be non-conforming at step 1143 and the remainder of the frame is deemed non-conforming at step 1145.

Figure 12:
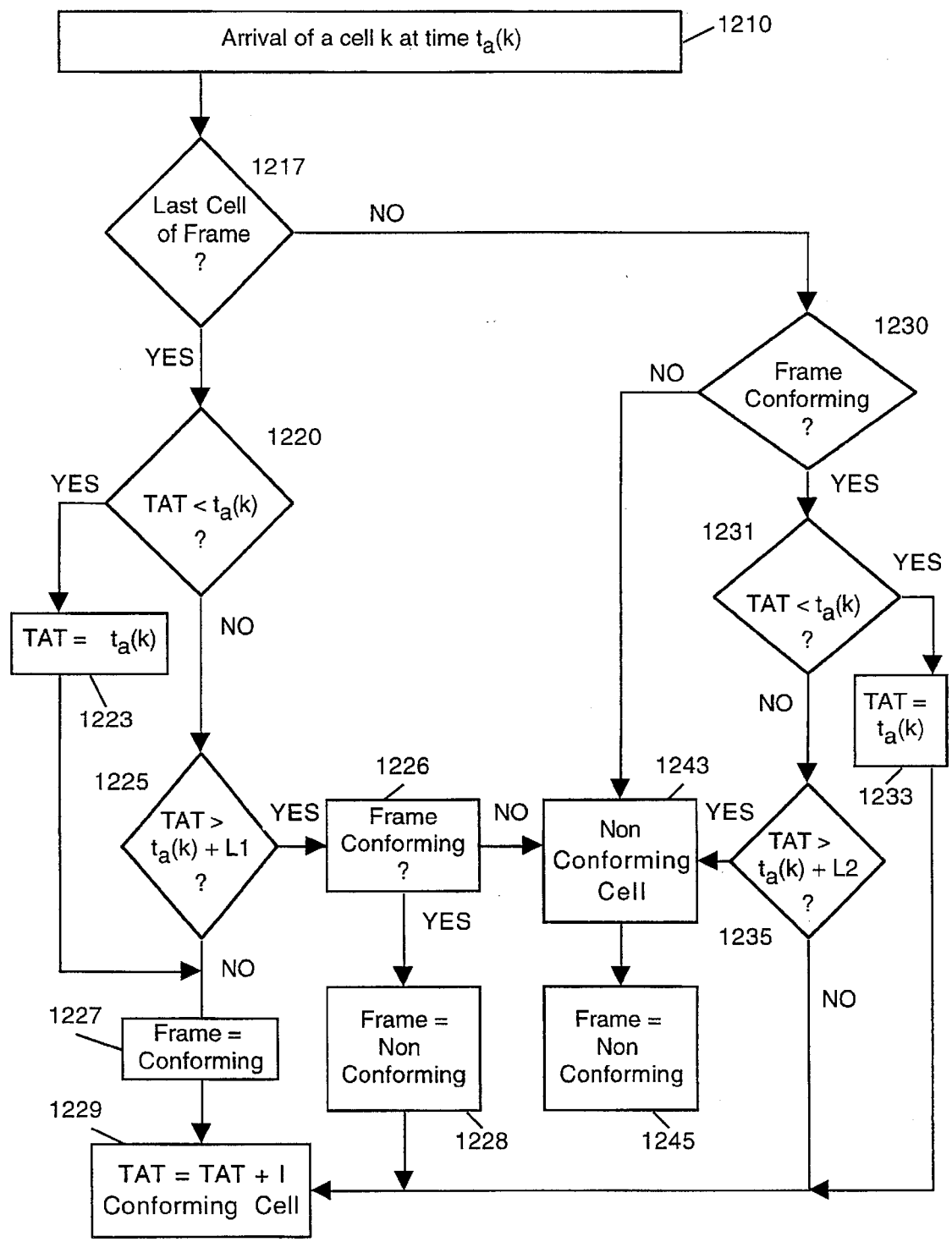
FIG. 12 illustrates a flow diagram of an alternate frame-based traffic policing system that uses the Virtual Scheduling Algorithm.

FIG. 12 illustrates a flow diagram that describes the steps performed by the frame based traffic policing system using the Virtual Scheduling algorithm where the last cell of a frame before a conforming frame is always deemed conforming. The method begins at step 1210 when an incoming data cell is received. The frame based traffic policing system then determines if the incoming data cell is the last data cell of a frame or not at step 1217. If a received data cell is the last data cell of a frame, the frame based traffic policing system proceeds to step 1220 where it checks if the arrival time of the $k^{th}$ cell, $t_a(k)$, is after the current value of the Theoretical Arrival Time (TAT). If that cell arrived after the Theoretical Arrival Time (TAT) then the cell is conforming and the next frame will be deemed conforming. This is accomplished by proceeding to steps 1223, 1227 and 1229 where the next frame is deemed conforming (step 1227) and the current cell is deemed conforming causing the Theoretical Arrival Time (TAT) to be updated to the current time $t_a(k)$ (at set 1223) plus the increment I (at step 1229). If the cell arrives before the Theoretical Arrival Time (TAT), then the algorithm checks if the cell arrived longer than a limit L1 time before the Theoretical Arrival Time (TAT) at step 1225. Specifically, if the arrival time of the $k^{th}$ cell is less than TAT–L1 (i.e., if TAT is greater than $t_a(k)$+L1), then that last cell is non-conforming. If the last data cell arrived within limit L1 of the Theoretical Arrival Time (TAT) then the next frame is deemed conforming at step 1227 and the cell is deemed conforming causing the bucket counter to be increased at step 1229. Otherwise, if the if the last cell arrived greater than L1 time units before the Theoretical Arrival Time (TAT), then the next frame will be deemed non-conforming. However, since this is the last cell of the current frame, it must still be handled appropriately. The traffic policing system method tests if the current frame is conforming at step 1226. If the current frame is not conforming then the last cell is deemed non-conforming at step 1243 and the frame is deemed non-conforming at step 1245. If the current frame is conforming then the next frame is deemed non-conforming at step 1228 and the last cell is deemed conforming causing the bucket counter to be increased at step 1229.

If at step 1217, the cell was determined not to be the last cell of the frame, then the cell is handled like all the other cells in the frame unless the second (overflow) limit of the bucket counter is reached. Specifically, non last cells are first tested at step 1230 to determine if the current frame is conforming. If the current frame is not conforming then the cell is treated as non-conforming at step 1243. If the current frame is conforming, then the cell is tested to see if it arrived after the Theoretical Arrival Time (TAT) at step 1231. If the cell arrived after the Theoretical Arrival Time (TAT) then the cell is deemed conforming causing the Theoretical Arrival Time (TAT) to be updated to the current time $t_a(k)$ (at set 1233) plus the increment I (at step 1229). If the cell arrived before the Theoretical Arrival Time (TAT), then another test is performed at step 1150 to determine if the arrival time of the $k^{th}$ cell is less than TAT–L2 (i.e., if TAT is greater than $t_a(k)$+L2). If the arrival time of the $k^{th}$ cell is less than TAT–L2 (TAT is greater than $t_a(k)$+L2), then the cell is non-conforming and the Theoretical Arrival Time (TAT) is unchanged at step 1143 and the remainder of the frame is deemed non-conforming at step 1245. Otherwise, the cell is conforming such that the Theoretical Arrival Time (TAT) is increased by the increment I at step 1229.

Although the present invention has been described in terms of specific exemplary embodiments, it will be appreciated that various modifications and alterations might be made thereto without departing from the spirit and scope of the invention. The specification and drawings are, accordingly, to be regarded in an illustrative rather than a restrictive sense.

What is claimed is:

1. A method of regulating incoming traffic on a data communication link, the method comprising the steps of:
    maintaining a counter for said communication link, said counter having a first limit;
    receiving incoming cells on said data communication link, said incoming cells grouped into frames;
    detecting if a received cell is a first cell in a frame,
        treating the received cell as conforming if the received cell is a first cell of the frame and said counter is within said first limit;
        treating the received cell as non-conforming if the received cell is a first cell of the frame and said counter is not within said first limit;
        treating the received cell as conforming if the received cell is not a first cell of the frame and the first cell of the frame was conforming; and
        treating the received cell as non-conforming if the received cell is not a first cell of the frame and the first cell of the frame was non-conforming.

2. The method of claim 1 further comprising the steps of:
    incrementing said counter by an increment value when a cell is treated as conforming;
    decrementing said counter by an amount proportional to an elapsed time.

3. The method as claimed in claim 2 wherein the counter has a second limit and said method further comprises the step of:
    treating the received cell as non-conforming if the received cell is not a first cell of the frame and the counter exceeds said second limit.

4. The method as claimed in claim 1 wherein the non-conforming cells are discarded.

5. The method as claimed in claim 1 wherein the non-conforming cells are tagged as low priority such that said tagged cells are first to be dropped when congestion occurs.

6. The method as claimed in claim 1 wherein the counter is permitted to go above said first limit to accommodate an entire data frame.

7. The method as claimed in claim 1 wherein some of said cells are End-of-Frame cells and said End-of-Frame cells are always treated as conforming.

8. The method as claimed in claim 7 wherein said End-of-Frame cells are used to determine a start of a next frame.

9. The method as claimed in claim 4 wherein an End-of-Frame cell is treated as conforming when a respective frame from which said End-of-Frame cell belongs is conforming or when a frame following said End-of-Frame cell is conforming.

10. The method as claimed in claim 9 wherein said End-of-Frame cells are used to determine a start of a next frame.

11. An apparatus for regulating a data communication link, said data communication link receiving cells grouped into frames, the apparatus comprising the elements of:

a counter, the counter having a first limit;

a cell detection mechanism, the cell detection mechanism detecting if a received cell is a first cell of a frame; and a traffic policing mechanism, the traffic policing mechanism determining a first cell of a frame to be conforming if the counter is below the first limit else determining said first cell of a frame to be non-conforming, the traffic policing mechanism determining a subsequent cell of said frame to be conforming if the first cell of the frame was conforming else determining said subsequent cell to be non-conforming.

12. The apparatus as claimed in claim 11 wherein the non-conforming cells are tagged as low priority such that said tagged cells are first to be dropped when congestion occurs.

13. The apparatus as claimed in claim 11 wherein said non-conforming cells are discarded.

14. The apparatus as claimed in claim 11 wherein the counter has a second limit and the traffic policing mechanism deems subsequent cells as non-conforming if said counter exceeds said second limit.

15. The apparatus as claimed in claim 14 wherein the counter is permitted to go above said first limit to accommodate a full data frame.

16. The apparatus as claimed in claim 11 wherein some of said cells are End-of-Frame cells and said End-of-Frame cells are always treated as conforming.

17. The apparatus as claimed in claim 16 wherein said End-of-Frame cells are used to determine a start of a next frame.

18. The apparatus as claimed in claim 11 wherein an End-of-Frame cell is treated as conforming when a respective frame from which said End-of-Frame cell belongs is conforming or when a frame following said End-of-Frame cell is conforming.

19. The apparatus as claimed in claim 18 wherein said End-of-Frame cells are used to determine a start of a next frame.

20. A method of regulating incoming traffic on a data communication link, said data communication link receiving cells, said cells organized into frames, said method comprising the steps of:

determining if a last cell of a frame would be conforming based upon a traffic policing function;

determining that cells in a subsequent frame following said last cell are nonconforming based upon whether said last cell was determined to be nonconforming.

21. The method as claimed in claim 20 wherein said traffic policing function is a continuous state leaky bucket algorithm.

22. The method as claimed in claim 20 wherein said traffic policing function is a virtual scheduling algorithm.

23. The method as claimed in claim 20 wherein said last cell of said frame is treated as conforming if said frame to which said last cell belongs was deemed to be conforming.

24. An apparatus for regulating a data communication link, said data communication link receiving cells grouped into frames, the apparatus comprising the elements of:

a counter, the counter having a first limit;

a cell detection mechanism, the cell detection mechanism detecting if a received cell is an End-of-Frame cell; and a traffic policing mechanism, the traffic policing mechanism determining an End-of-Frame cell of a frame to be conforming if the counter is below the first limit else determining said End-of-Frame cell to be non-conforming, the traffic policing mechanism determining a subsequent frame to be conforming if said End-of-Frame cell was conforming else determining said subsequent frame to be non-conforming.

25. The apparatus as claimed in claim 24 wherein the non-conforming cells are tagged as low priority such that said tagged cells are first to be dropped when congestion occurs.

26. The apparatus as claimed in claim 24 wherein said non-conforming cells are discarded.

27. The apparatus as claimed in claim 24 wherein the counter has a second limit and the traffic policing mechanism deems subsequent cells as non-conforming if said counter exceeds said second limit.

28. The apparatus as claimed in claim 24 wherein the counter is permitted to go above said first limit to accommodate a full data frame.

29. The apparatus as claimed in claim 24 wherein said End-of-Frame cells are always treated as conforming.

30. The apparatus as claimed in claim 24 wherein said traffic policing mechanism is a continuous state leaky bucket algorithm.

31. The apparatus as claimed in claim 24 wherein said traffic policing mechanism is a virtual scheduling algorithm.

32. The apparatus as claimed in claim 24 wherein an End-of-Frame cell is treated as conforming if a frame to which said End-of-Frame cells belongs is conforming.

* * * * *